G. W. MEIXELL.
Improvement in Corn-Plow and Marker.

No. 132,405.

Patented Oct. 22, 1872.

UNITED STATES PATENT OFFICE.

GEORGE W. MEIXELL, OF HECKTOWN, PENNSYLVANIA.

IMPROVEMENT IN CORN PLOWS AND MARKERS.

Specification forming part of Letters Patent No. 132,405, dated October 22, 1872.

*To all whom it may concern:*

Figure 1:
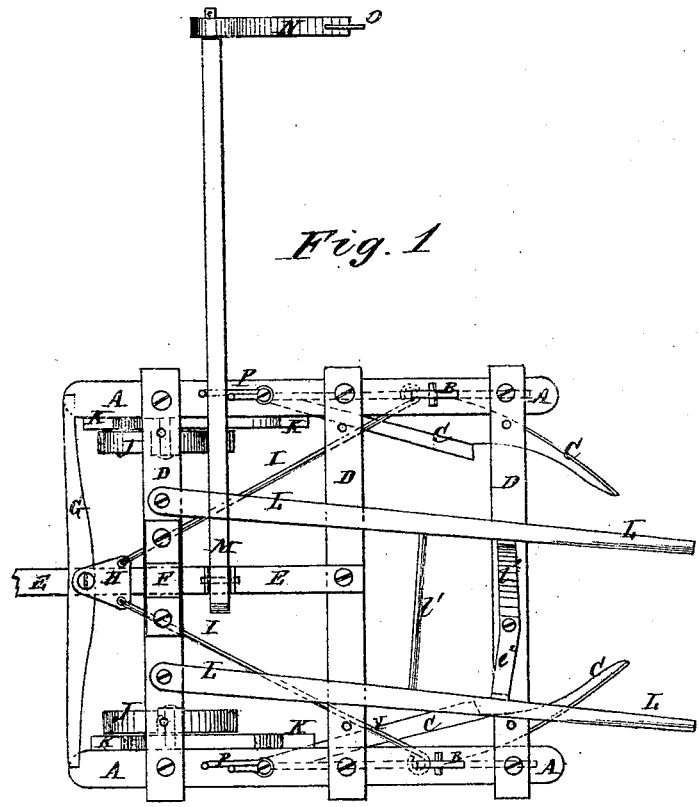
Figure 2:
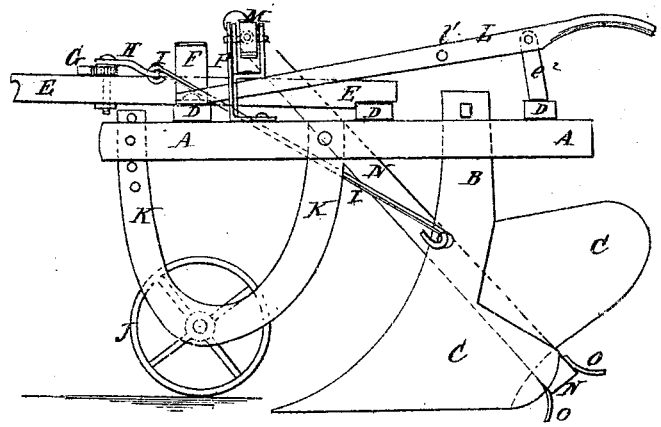

Be it known that I, GEORGE W. MEIXELL, of Hecktown, in the county of Northampton and State of Pennsylvania, have invented a new and useful Improvement in Combined Corn-Plow and Marker, of which the following is a specification:

Figure 1 is a top view of my improved machine, and Fig. 2 is a side view of the same.

Similar letters of reference indicate corresponding parts.

My invention has for its object to furnish an improved machine for furrowing the ground for planting and cultivating the plants, and which shall be simple in construction, convenient in use, and effective in operation; and it consists in the construction and arrangement of the different parts of the machine, as hereinafter more fully described.

A are the two beams, to which the standards B of the plows C are attached, and which are connected and held in their proper relative positions by the cross-bars D, which are secured to the upper sides of the beams A by screws or bolts, several holes being formed in the said cross-bars to receive the said screws or bolts so that the plows may be conveniently adjusted wider apart or closer together as circumstances may require. E is the tongue, the rear end of which is loosely bolted to the center of the central cross-bar D. The tongue E passes through a keeper, F, which is attached to the middle part of the forward cross-bar D, and which is so formed as to allow the said tongue E to have a vertical but no lateral movement. This construction relieves the horses' necks from having to support any weight, and at the same time leaves the plows free to follow the surface of the ground. G is the double-tree, which is pivoted to the tongue E a little in front of the front cross-bar D. To the double-tree bolt is pivoted a small plate, H, to which are pivoted the forward ends of the draft-bars I, the rear ends of which are pivoted to the plow-standards B, so that the draft may be applied directly to the plows. The depth at which the plows C work in the ground is regulated by the gage-wheels J, which are pivoted to the lower parts or bends of the U-shaped brackets K, the arms of which are secured to the sides of the beams A by bolts, several holes being formed in the forward arms to receive the said bolts, so that the gage-wheels may be readily adjusted to cause the plows to work at any desired depth in the ground. L are the handles, the forward ends of which are secured to the forward cross-bar D. The handles L are connected and held in the proper relative position by a round, $l^1$, and are suppported at the proper elevation by the braces $l^2$, which are attached to the rear cross-bar D. The handles L may be inclined to allow the plowman while guiding the plows to walk at the side of the row of plants being cultivated. To the tongue E between the front and central cross-bars D is pivoted the end of a bar, M, in such a way that the said bar can have a free vertical but no lateral movement upon its pivot. To the outer end of the bar M is swiveled the upper end of a bar, N, which should be of such a length that its lower end may drag upon the ground. To the opposite sides of the lower end of the bar N are attached hooks or prongs O to mark the ground as the machine is drawn forward. To the beams A are attached brackets P to receive the bar M, and hold it always at right angles with the machine. By this construction the marker may be turned from one side to the other as the machine passes back and forth across the field, working equally well at either side.

Having thus described my invention, I claim as new, and desire to secure by Letters Patent—

The plow-tongue E, vertically movable in keeper F on cross-bar D and provided with double-tree G, combined with plate H and draft-bars I I, the latter pivoted to the plow-standards B, as described, to give a concentered draft.

GEORGE W. MEIXELL.

Witnesses:
GEORGE W. JOHNSON,
CORNELIUS BRUNNER.